United States Patent
Ashihara et al.

(10) Patent No.: US 8,002,719 B2
(45) Date of Patent: Aug. 23, 2011

(54) WALKING ASSISTANCE DEVICE

(75) Inventors: Jun Ashihara, Wako (JP); Yutaka Hiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1013 days.

(21) Appl. No.: 11/908,571

(22) PCT Filed: May 29, 2006

(86) PCT No.: PCT/JP2006/310656
§ 371 (c)(1),
(2), (4) Date: Sep. 13, 2007

(87) PCT Pub. No.: WO2006/126709
PCT Pub. Date: Nov. 30, 2006

(65) Prior Publication Data
US 2008/0289670 A1    Nov. 27, 2008

(30) Foreign Application Priority Data

May 27, 2005  (JP) ................................ 2005-155329
Jul. 29, 2005  (JP) ................................ 2005-220856

(51) Int. Cl.
*A61H 1/00*   (2006.01)
*A61F 5/00*   (2006.01)

(52) U.S. Cl. .................. 601/5; 601/33; 601/34; 601/35; 602/16; 602/23

(58) Field of Classification Search ................. 601/5, 23, 601/26, 27, 33, 34, 35; 602/5, 16, 23, 26, 602/27
See application file for complete search history.

(56) References Cited

U.S. PATENT DOCUMENTS

| 4,872,665 A | 10/1989 | Chareire |
| 5,476,441 A * | 12/1995 | Durfee et al. .................... 602/23 |

FOREIGN PATENT DOCUMENTS

| DE | 44 08 351 | 9/1994 |
| GB | 2 278 041 | 11/1994 |
| JP | 05-329186 | 12/1993 |
| JP | 07-112035 | 5/1995 |
| JP | 2003-220102 | 8/2003 |

* cited by examiner

*Primary Examiner* — Quang D Thanh
(74) *Attorney, Agent, or Firm* — Rankin, Hill & Clark LLP

(57) ABSTRACT

A walking assisting device having leg links connected to a load transfer portion, wherein each leg link is free to bend and stretch at a joint in the middle of the leg link, the leg link being formed to a length such that the joint projects forward of a reference line when a user is standing upright. The reference line is a line connecting a swing fulcrum of the leg link to a joint at the lower end of the leg link. Stability is improved by diminishing a moment in a forward tilting direction when the user is standing upright. The leg links are provided with an overhanging portion and a driving source mounted on the overhanging portion, which helps maintain balance relative to the reference line. The driving force is transmitted to the joint in the middle of the leg link via driving force transmission means.

16 Claims, 6 Drawing Sheets

WALKING ASSISTANCE DEVICE

TECHNICAL FIELD

The present invention relates to a walking assisting device for assisting walking by reducing load on user's legs.

BACKGROUND ART

Conventionally, as this type of walking assisting device, there is known a device including a load transfer portion and a leg link connected to the load transfer portion, wherein at least a part of the user's weight is supported by the leg link via the load transfer portion to reduce load on a user's leg so as to assist the user in walking (for example, refer to Japanese Patent Laid-Open No. 2003-220102). In this structure, the load transfer portion includes a waist support belt attached around a user's waist with a pair of left and right leg links connected to each other via first joints corresponding to human hip joints on both sides of the waist support belt in the lateral direction. The leg links are each formed of a freely bending and stretching link having a second joint corresponding to a human knee joint midway in the vertical direction. In addition, the leg link is connected to foot attachment portion which is attached to a user's foot at the lower end of the leg link via a third joint. Moreover, a driving source coaxial with the second joint is mounted on each leg link so as to generate weight relief assist force for supporting a part of the user's weight by means of a rotational drive of the second joint caused by the driving source.

Each leg link is generally formed in a length tailored to the length of a user's leg so that the leg link is stretched when the user is standing upright. This, however, causes a need to manufacture a dedicated device for an individual, which leads to an increase in cost. Therefore, it is desired that the leg links are each formed in such a length that the leg link is bent with the second joint projecting forward or backward of a reference line even if the user is standing upright, where the reference line is defined as a line connecting the forward/backward swing fulcrum of the leg link in the first joint to the third joint. According thereto, the height of the load transfer portion can be automatically adjusted in accordance with the user by controlling the driving source. Therefore, this eliminates the need for manufacturing a dedicated device for an individual, thereby achieving a versatile walking assisting device and lowering costs.

If the leg link is bent when the user is standing upright, however, the walking assisting device will have the following defects. Specifically, when the user is standing upright, the reference line is substantially vertical. Therefore, if the second joint projects forward of the reference line, the weight of the leg link including the driving source coaxial with the second joint generates a swing moment in a forward tilting direction around the third joint in the leg link, thereby applying a forward push force to the load transfer portion. Furthermore, if the second joint projects backward of the reference line, it generates a swing moment in a backward tilting direction around the third joint in the leg link, thereby applying a backward push force to the load transfer portion.

DISCLOSURE OF THE INVENTION

The present invention has been provided in view of the above background. Therefore, it is an object of the present invention to provide a walking assisting device capable of improving stability by preventing the push force in the forward/backward direction from being applied to the load transfer portion in spite of using leg links each having such a length that it is bent even if the user is standing upright.

In order to achieve the above object, according to one aspect of the present invention, there is provided a walking assisting device comprising a load transfer portion and a leg link connected to the load transfer portion via a first joint in such a way as to be swingable in the forward and backward direction, in which at least a part of the user's weight is supported by the leg link via the load transfer portion, the leg link including a freely bending and stretching link having a second joint midway in the vertical direction, with a foot attachment portion attached to a user's foot being connected to the lower end of the leg link via a third joint, and the leg link being formed in such a length that it is bent with the second joint projecting forward or backward of a reference line even if the user is standing upright, where the reference line is defined as a line connecting the forward/backward swing fulcrum of the leg link in the first joint to the third joint; wherein the leg link is provided with an overhanging portion which projects on the side opposite to the second joint in the forward and backward direction relative to the reference line, with a weight member mounted on the overhanging portion.

When the user is standing upright, the weight of the leg link (excluding the weight member) generates a swing moment in a forward tilting direction (if the second joint projects forward of the reference line) or in a backward tilting direction (if the second joint projects backward of the reference line) around the third joint in the leg link. According to the present invention, however, the weight member is located on the side opposite to the second joint in the forward/backward direction across the reference line, and therefore the weight of the weight member generates a swing moment in the direction reverse to that of the swing moment generated by the weight of the leg link. In other words, the weight member functions as a counterweight, which diminishes the swing moment of the entire leg link including the weight member. As a result, the swing moment reduces the forward/backward push force applied to the load transfer portion, thereby improving the stability.

If the leg link is bent in such a way that the second joint projects forward of the reference line, a backward swing moment occurs around the forward/backward swing fulcrum in the first joint in the leg link when the user swings his leg forward, thereby giving a resistance to the forward swing of the leg. According to the present invention, however, when the second joint projects forward of the reference line, the overhanging portion projects backward of the reference line. Therefore, the weight of the weight member mounted on the overhanging portion generates a forward swing moment around the forward/backward swing fulcrum in the first joint, and this moment assists the user in swinging his leg forward. Therefore, even if the leg link is bent in such a way that the second joint projects forward of the reference line, there is no resistance given to the forward swing of the leg.

Meanwhile, if the moment of inertia of the leg link around the first joint increases, the user's leg feels heavy while walking due to the moment of inertia of the leg link applied to the leg. In this case, the overhanging portion is provided at the end of the leg link on the side of the first joint, which reduces the distance between the weight member mounted on the overhanging portion and the first joint. Therefore, it is possible to reduce the moment of inertia of the leg link around the first joint and to thereby facilitate walking.

The weight member preferably includes a driving source for the second joint. More specifically, the driving source for the second joint is mounted on the leg link from the beginning. Using the driving source serving as the weight member prevents an increase in the weight of the leg link. In this case, the driving force generated by the driving source is transmitted to the second joint via driving force transmission means.

The driving force transmission means preferably includes a wire transmission mechanism with a wire between the second joint and the driving source. Note here that the driving force transmission means can be a linkage with a parallel link or a hydraulic transmission mechanism with a hydraulic cylinder. The wire transmission mechanism, however, is more advantageous because it can reduce the weight and cost.

BEST MODE FOR CARRYING OUT THE INVENTION

Figure 1:
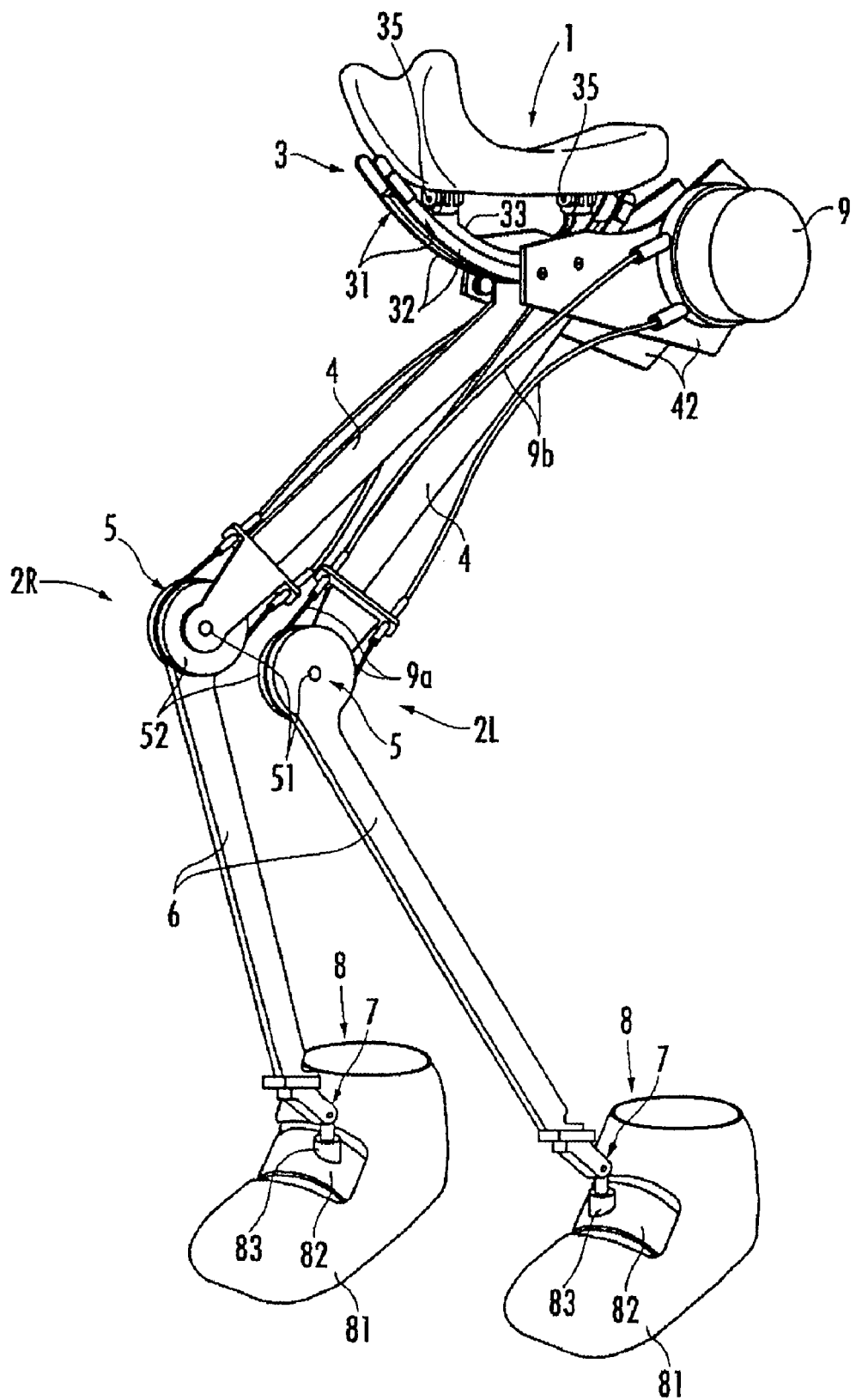
FIG. 1 is a perspective diagram of a walking assisting device according to an embodiment of the present invention.
Figure 2:
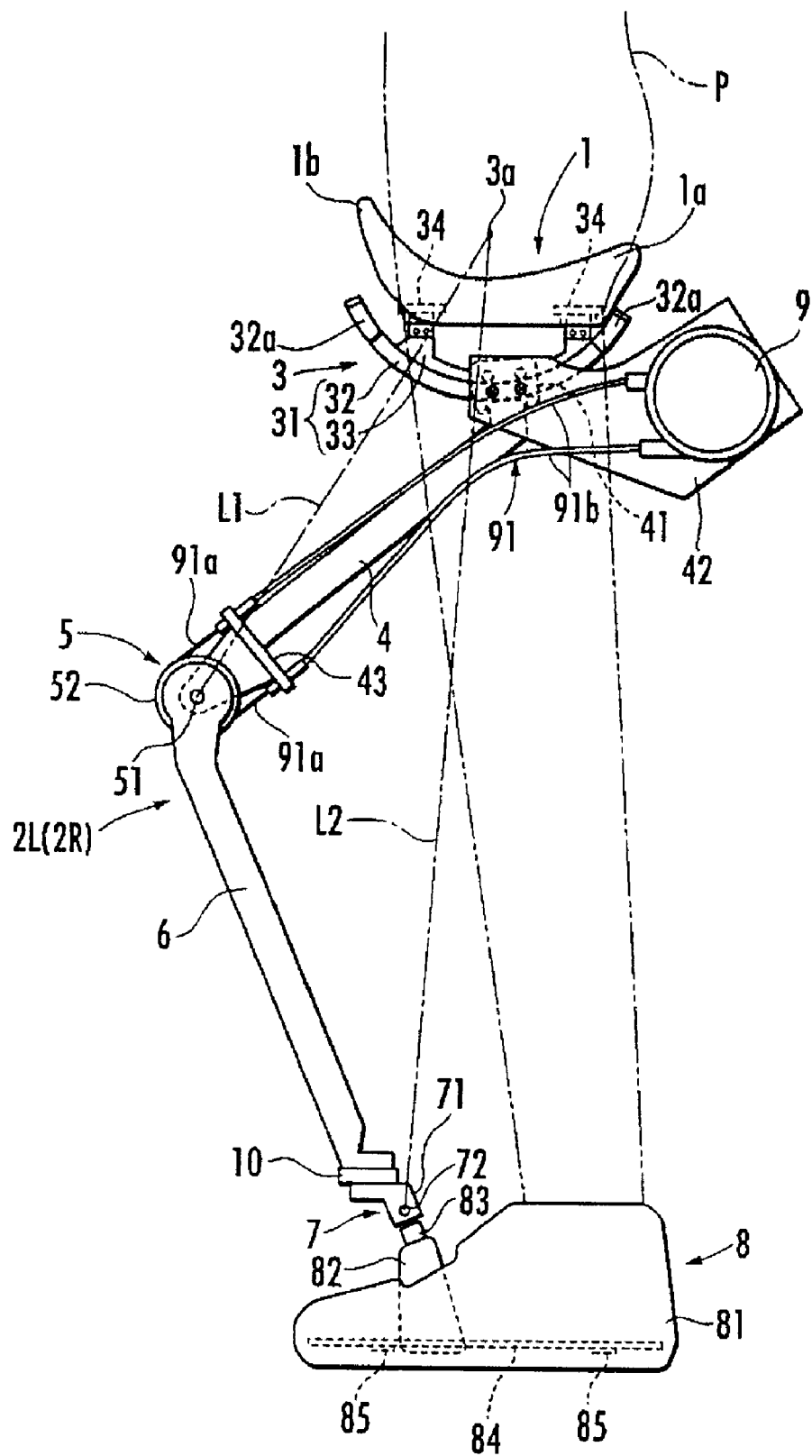
FIG. 2 is a side view of the walking assisting device according to the embodiment.
Figure 3:
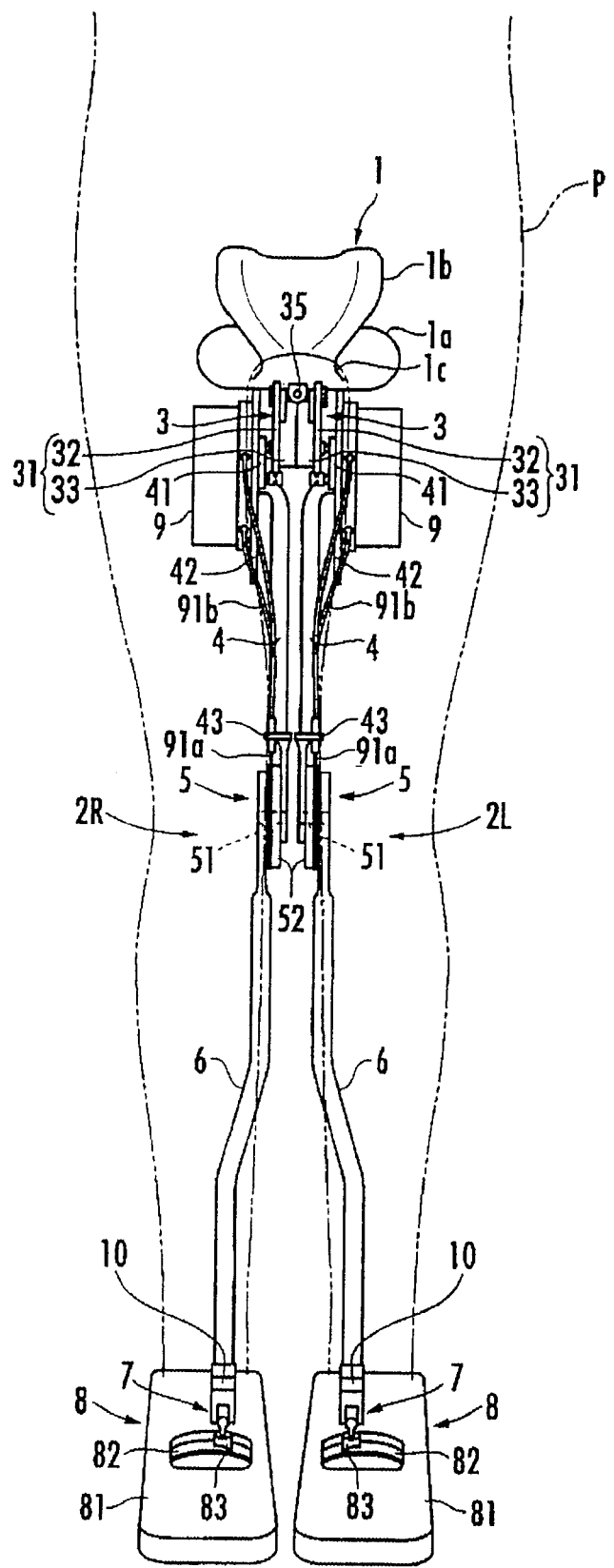
FIG. 3 is a front view of the walking assisting device according to the embodiment.

A walking assisting device according to an embodiment of the present invention will be described hereinafter. As shown in FIG. 1 to FIG. 3, the walking assisting device includes a seat member 1 serving as a load transfer portion which a user P sits astride and a pair of left and right leg links 2L and 2R attached under the seat member 1.

The leg links 2L and 2R are each composed of a freely bending and stretching link, which has a first link 4 swingably connected to the undersurface of the seat member 1 via a first joint 3 in the forward/backward direction and a second link 6 connected to the lower end of the first link 4 via a second joint 5. In addition, the lower end of the second link 6 is connected to a foot attachment portion 8 attached to each of the user's left and right feet via a third joint 7. Furthermore, the leg links 2L and 2R are each equipped with a driving source 9 for the second joint 5. Then, the driving source 9 is used to rotationally drive the second joint 5 to apply a force in the direction of bending or stretching to each of the leg links 2L and 2R in order to generate bearing power for supporting at least a part of the user's weight (hereinafter, referred to as a weight relief assist force). The weight relief assist force generated in each of the leg links 2L and 2R is transmitted to the body of the user P via the seat member 1 and the load on the leg of the user P is thereby reduced. Although not shown here, a power supply and controller for the driving source 9 are housed in a backpack carried on user's back.

The user P can use the walking assisting device according to this embodiment by only wearing the foot attachment portions 8 on his feet and sitting on the seat member 1. Therefore, the user P can use the walking assisting device without having a constrained feeling. In addition, the first joints 3 and the first links 4 of the leg links 2L and 2R are located under the crotch of the user P and therefore the user P does not hit his hands against the first joints 3 or the first links 4 when swinging his arms while walking, by which the user P can swing his arms freely. Moreover, the device is small in size and therefore it can be used in a small place, by which the usability is remarkably improved in addition to the reduced constrained feeling and the secured free arm swing.

Figure 4:
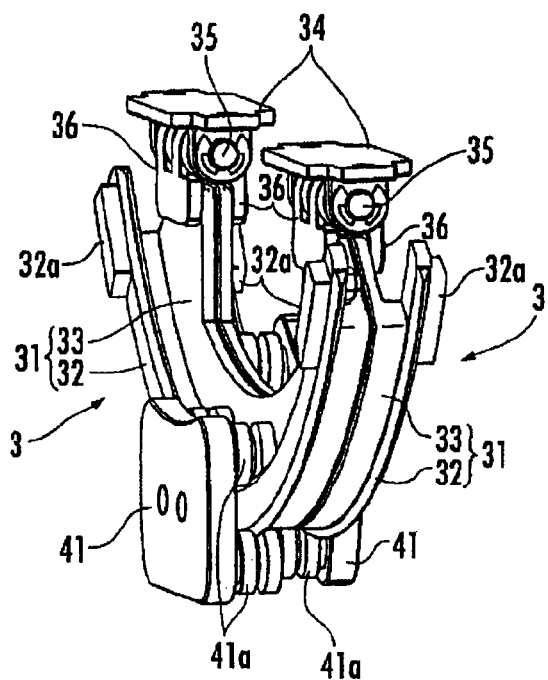
FIG. 4 is a fragmentary perspective diagram of first joints of the walking assisting device according to the embodiment.
Figure 5:
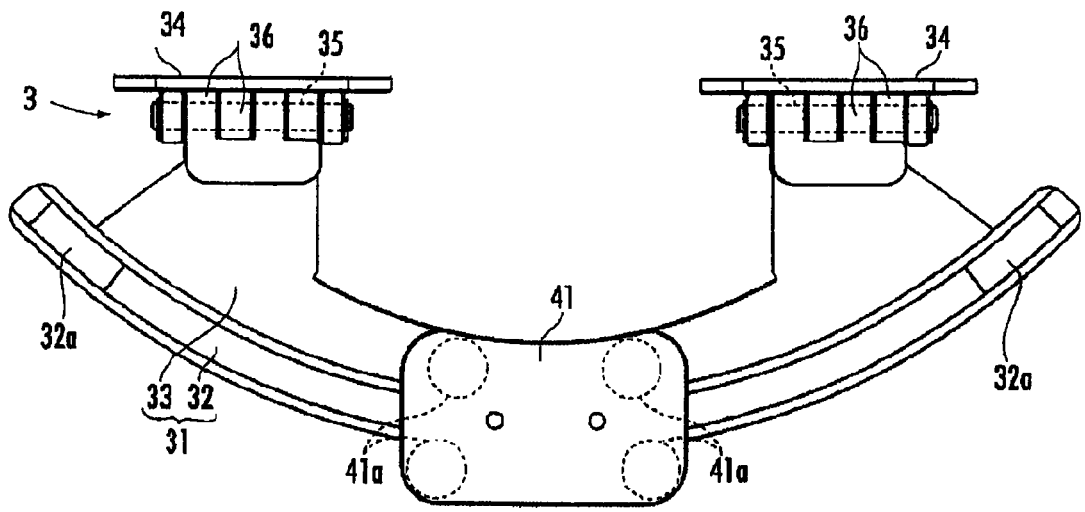
FIG. 5 is a fragmentary side view of the first joint of the walking assisting device according to the embodiment.

The first joints 3 for the leg links 2L and 2R are each composed of a joint member 31 including an arc-shaped guide track 32 longitudinal in the forward/backward direction and a support plate 33 for supporting the guide track 32 as clearly shown in FIG. 4 and FIG. 5. While the guide track 32 is composed of an arc-shaped rail in this embodiment, it can also be composed of an arc-shaped groove formed in the support plate 33. At the upper end of the first link 4 of each of the leg links 2L and 2R, there is provided a slider 41 having vertical pairs of rollers 41a with the guide track 32 vertically interposed therebetween from both sides, so that the slider 41 movably engages with the guide track 32 via the rollers 41a. In this way, the leg links 2L and 2R swing in the forward/backward direction around the center of curvature of the guide track 32 and the forward/backward swing fulcrum of the leg links 2L and 2R functions as the center of curvature of the guide track 32.

As shown in FIG. 2, the center of curvature of the guide track 32, namely the forward/backward swing fulcrum 3a of each of the leg links 2L and 2R in each first joint 3 is located above the seat member 1. If the user P bends his upper body forward or the like at this moment and thereby the action point of the weight of the upper body of the user P relative to the seat member 1 is misaligned forward of the forward/backward swing fulcrum 3a of each of the leg links 2L and 2R, the seat member 1 inclines forward and downward. If the seat member 1 continues to incline further, it is misaligned backward relative to the user P. In this embodiment, however, the action point of the weight is displaced backward under the swing fulcrum 3a together with the forward and downward inclination of the seat member 1 and thereby the forward/backward distance between the fulcrum 3a and the action point of the weight decreases, which thereby decreases the angular moment applied to the seat member 1. Thereafter, the angular moment applied to the seat member 1 becomes zero when the action point of the weight is displaced up to the position just under the swing fulcrum 3a, which stabilizes the seat member 1 in this state. Since the seat member 1 automatically converges on the stable state in this way, it is possible to prevent the seat member 1 from being misaligned in the forward/backward direction under the crotch of the user P.

In addition, the slider 41, which is the upper end of each of the leg links 2L and 2R, engages with a part of the guide track 32, which is located backward of a line L1 between the second joint 5 of each of the leg links 2L and 2R and the forward/backward swing fulcrum 3a (the center of curvature of the guide track 32) of each of the leg links 2L and 2R. This secures a forward swing stroke of each of the leg links 2L and 2R that follows the forward swing motion of the leg of the user P without a need for the guide track 32 being particularly long in the forward direction. In addition, a stopper 32a is attached to each of the forward and backward ends of the guide track 32 in order to prevent the first links 4 from being uncoupled.

Furthermore, the joint member 31, which is a component of each of the first joint 3 for each of the left and right leg links 2L and 2R, is pivotally supported by forward/backward spindles 35 and 35 supported by a pair of front and back support blocks 34 and 34 attached in the laterally center of the undersurface of the seat member 1, via hinge members 36 and 36 attached to the upper front and back ends of the support plate 33. Therefore, each of the joint members 31 (the first joints 3) is connected to the undersurface of the seat member 1 swingably in the lateral direction. This allows the leg links 2L and 2R to swing in the lateral direction, by which the user P can swing his legs outward.

Furthermore, the joint member 31 for the left leg link 2L and the joint member 31 for the right leg link 2R are pivotally supported by the common spindles 35. In other words, the lateral swing fulcrum of the first joint 3 for the left leg link 2L and the lateral swing fulcrum of the first joint 3 for the right leg link 2R are located on the same forward/backward axis line. In a one-leg supporting state, the weight of the leg link on the side of the idling leg (the leg with the foot off the floor) (or an assist force if there is generated the assist force for assisting in lifting the idling leg by applying a force to the leg link in the direction of bending it as described later) is applied to the seat member 1 via the lateral swing fulcrum of the first joint 3 for the leg link. If the lateral swing fulcrum of the first joint 3 for the left leg link 2L is displaced from the lateral swing fulcrum of the first joint 3 for the right leg link, the seat member 1 is affected by a rolling moment generated around the lateral swing fulcrum of the first joint 3 for the leg link on the side of the supporting leg (the leg with the foot on the floor) due to the weight of the leg link on the side of the idling leg in the one-leg supporting state, which causes the rolling of the seat member 1.

On the other hand, the lateral swing fulcrum of the first joint 3 for the leg link on the side of the idling leg, to which the weight of the leg link on the side of the idling leg is applied, is located on the same axis line (the spindles 35) as one for the lateral swing fulcrum of the first joint 3 for the leg link on the side of the supporting leg in the one-leg supporting state in this embodiment. Therefore, the seat member 1 is not affected by the rolling moment generated around the lateral swing fulcrum of the first joint 3 for the leg link on the side of the supporting leg. Therefore, it is possible to prevent the rolling of the seat member 1 in the one-leg supporting state. The weight of the leg link on the side of the idling leg is transmitted to the floor via the leg link on the side of the supporting leg, and the seat member 1 is not affected by the weight of the leg link on the side of the idling leg.

Moreover, the leg links 2L and 2R are each formed in such a length that the leg link is bent with the second joint 5 projecting forward of a reference line L2 even if the user P is standing upright, where the reference line L2 (see FIG. 2) is a line connecting the forward/backward swing fulcrum 3a of the leg links 2L and 2R in the first joint 3 to the third joint 7. In addition, the height of the seat member 1 can be automatically adjusted to fit the user P with the control of the driving source 9. Therefore, there is no need to manufacture a dedicated device for an individual or to adjust the lengths of the leg links, thereby achieving a versatile walking assisting device and lowering costs.

In the upright state of the user P, the reference line L2 is almost vertical at this moment and almost all parts of each of the leg links 2L and 2R including the second joint 5 are located forward of the third joint 7. Therefore, if the driving source 9 is placed on the same axis as the second joint 5, the weight of each of the leg links 2L and 2R including the driving sources 9 generates a large swing moment in a forward tilting direction around the third joint 7 in each of the leg links 2L and 2R when the user P is standing upright. Thereby, the swing moment causes a forward push force to act on the seat member 1. Furthermore, when the user P swings his leg forward, a backward swing moment occurs around the forward/backward swing fulcrum 3a in the first joint 3 in each of the leg links 2L and 2R, thereby giving a resistance to the forward swing of the leg. If the driving source 9 is placed on the same axis as the second joint 5, the moment of inertia of each of the leg links 2L and 2R around the first joint 3 increases, by which the legs of the user P feel heavy while walking due to the moments of inertia of the leg links 2L and 2R applied to the legs.

Therefore, in this embodiment, there is attached an overhanging portion 42 made of a board member projecting backward, which is opposite to the second joint 5 in the forward/backward direction relative to the reference line L2, to the slider 41 at the end of each of the leg links 2L and 2R on the side of the first joint 3, namely at the upper end of the first link 4, and there is mounted a driving source 9 for the second joint 5 on the overhanging portion 42 as a weight member. Thereby, when the user P is standing upright, the reverse swing moment generated by the weight of the driving source 9 diminishes the swing moment in the forward tilting direction around the third joint 7 generated in each of the leg links 2L and 2R by the weight of each of the leg links 2L and 2R excluding the driving source 9. More specifically, the driving source 9 functions as a counterweight to reduce the entire swing moment of each of the leg links 2L and 2R including the driving source 9. In consequence, the forward push force applied to the seat member 1 diminishes, too, and thereby the stability is improved.

Furthermore, when the user P swings his leg forward, the forward swing moment occurs around the forward/backward swing fulcrum 3a due to the weight of the driving source 9 and this moment assists the leg in swinging forward. Therefore, it is possible to eliminate the resistance to the forward swing of the leg, which becomes a problem when the leg links 2L and 2R are bent with the second joints 5 projecting forward of the reference line L2. Additionally the distance between the driving source 9 as a heavy load and the swing fulcrum 3a decreases, which diminishes the moments of inertia of the leg links 2L and 2R around the first joints 3. Therefore, it is possible to prevent the legs of the user P from feeling heavy while walking due to the moments of inertia of the leg links 2L and 2R applied to the legs.

The driving force generated by the driving source 9 is transmitted to the second joint 5 via driving force transmission means 91. As the driving force transmission means 91, it is possible to use a parallel linkage with a link connected in parallel to the first link 4 or a hydraulic transmission mechanism with a hydraulic cylinder in a portion apart from the second joint 5 of the second link 6. In this embodiment, however, the driving force transmission means 91 is composed of a wire transmission mechanism with a wire 91a between the second joint 5 and the driving source 9 for a reduction in weight and cost.

The details thereof are as described below. More specifically, two wires 91a are led out from the driving source 9: one wire 91a is paid out from the driving source 9, while the other wire 91a is drawn into the driving source 9. The driving source 9 includes an electric motor and a drive pulley for the wire 91a driven by the motor. The wires 91a and 91a are passed through two guide tubes 91b and 91b, respectively, provided between a flange 43 formed in the vicinity of the second joint 5 of the first link 4 and the driving source 9. Additionally, a pulley 52 coaxial with a shaft 51 of the second joint 5 is fixed to the second link 6, the two wires 91a and 91a are wound around the pulley 52 in the direction reverse to each other, and the ends of the wires 91a and 91a are fixed to the pulley 52. In this way, the pulley 52 is rotated by paying out and drawing the wires 91a and 91a from and into the driving source 9, and the rotation causes the second link 6 to swing around the shaft 51 of the second joint 5 relative to the first link 4, thereby bending and stretching the leg links 2L and 2R. Although not shown, an arc-shaped groove is formed on the side surface of the pulley 52 and a protruding portion engaging with the groove is formed in the first link 4 in order to limit the swing stroke of the second link 6 relative to the first link 4 to a given range.

Figure 6:
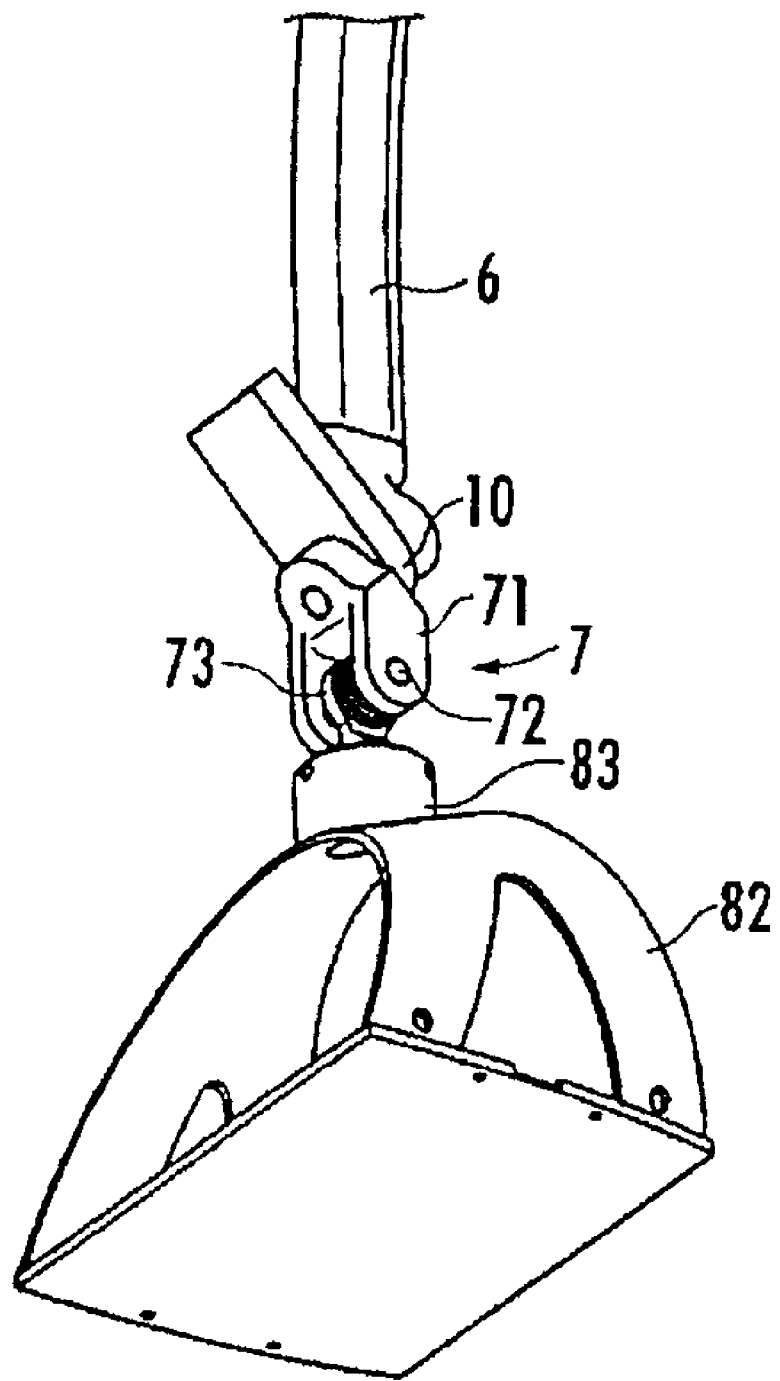
FIG. 6 is a perspective diagram of a lower end of a leg link of the walking assisting device according to the embodiment.

As shown in FIG. 6, the third joint 7 includes a free joint composed of a yoke 71 connected to the lower end of the second link 6 via a 2-axis force sensor 10 and a moving element 73 connected to a shaft 72 laterally provided at the lower end of the yoke 71 rotatably and also free to tilt axially. The weight relief assist force described above acts on the reference line L2 connecting the forward/backward swing fulcrum 3a of the leg links 2L and 2R in the first joint 3 to the third joint 7, when viewed from the lateral perspective. An actual weight relief assist force (to be exact, a resultant force between the weight relief assist force and the force generated by the weights of the seat member 1 and the leg links 2L and 2R) acting on the reference line L2 is calculated based on a detected value of the force in the 2-axis direction detected by the force sensor 10.

The foot attachment portion 8 includes a shoe 81 and a highly rigid armor coupled ring 82 shown in FIG. 6, which is embedded in the shoe 81. A collar 83 is arranged in a standing condition on the upper surface of the coupled ring 82 and the collar 83 is connected to the lower end of the moving element 73 of the third joint 7. Furthermore, as shown in FIG. 2, an elastic plate 84 to be an insole of the shoe 81 is put on the backside of the coupled ring 82. On the undersurface of the elastic plate 84, there are mounted a pair of front and back pressure sensors 85 and 85 for detecting loads on the metacarpophalangeal joint (MP joint) and the heel of the user's foot.

To control each of the leg links 2R and 2L, the ratio of the load imposed on each foot to the total load on the user's feet is calculated based on the detected values of the pressure sensors 85 and 85 in each of the foot attachment portions 8. Subsequently, a control target value for a weight relief assist force that should be generated in each leg link is calculated by multiplying a preset value of the weight relief assist force by the ratio of the load on each foot. Thereafter, the driving source 9 is controlled in such a way that an actual weight relief assist force calculated based on the detected value of the force sensor 10 is consistent with the control target value. In the one-leg supporting state, the weight relief assist force of the preset value is generated only with the leg link on the side of the supporting leg. In this instance, the driving of the driving source of the leg link on the side of the idling leg is stopped to allow the second joint 5 to be freely rotated. It is also possible to apply a force in the bending direction to the leg link on the side of the idling leg from the driving source to assist the foot of the idling leg in lifting.

The weight relief assist force acts on the line connecting the spindle 35 as the lateral swing fulcrum of the first joint 3 to the third joint 7, when viewed from the front. Therefore, a long lateral distance between the spindle 35 and the third joint 7 increases a lateral component of the weight relief assist force and thus increases a lateral force applied on the foot attachment portion 8 and the seat member 1. Therefore, in this embodiment, as shown in FIG. 3, the collar 83 on the upper surface of the coupled ring 82 is arranged laterally inside so that the third joint 7 is located laterally inside from the center of the width of the foot attachment portion 8. According thereto, the lateral distance between the spindle 35 and the third joint 7 decreases and a smaller lateral force acts on the foot attachment portion 8 and the seat member 1, thereby improving the stability of the foot attachment portion 8 and the seat member 1.

Figure 7A:
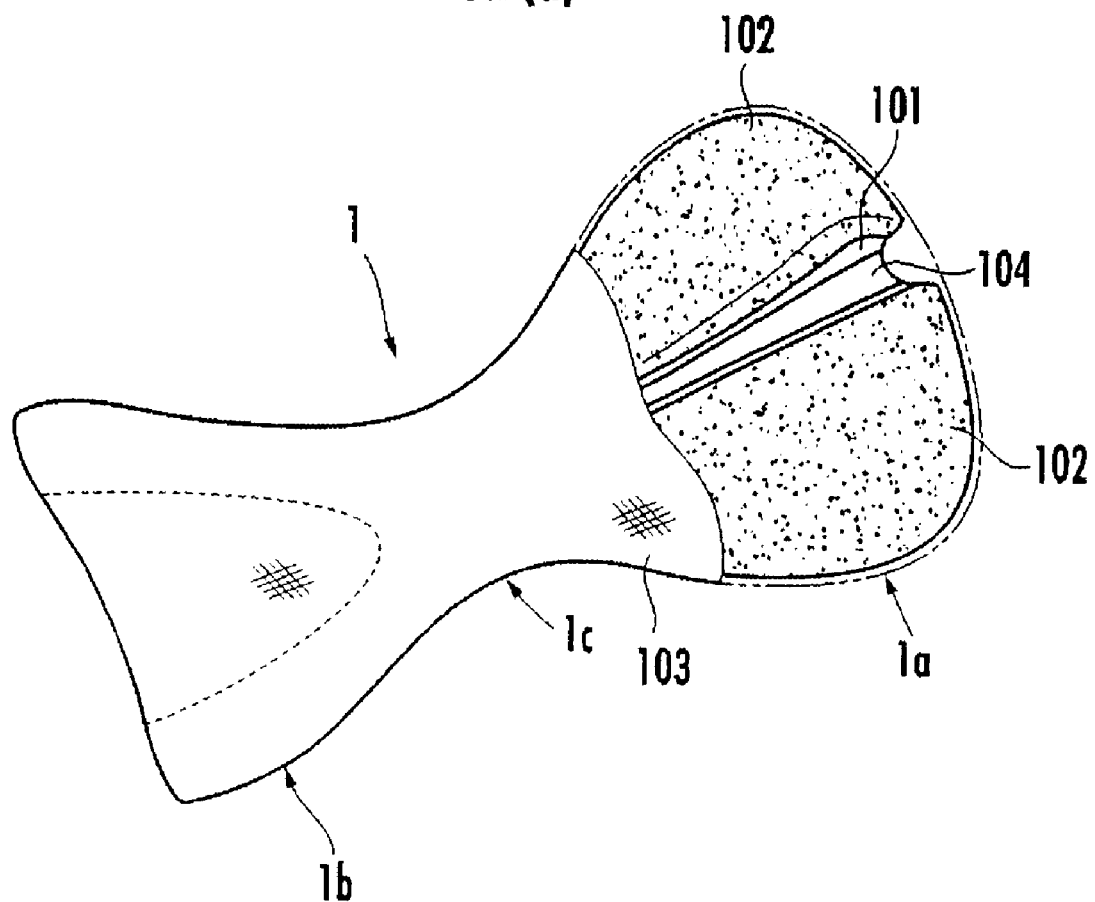
FIG. 7(a) is a perspective diagram of a seat member of the walking assisting device according to the embodiment and FIG. 7(b) is a perspective diagram of a core of the seat member.

While various kinds of things have been done to stabilize the seat member 1 as described above, some thought is also put into the seat member 1 itself in this embodiment. The thought will be described in detail hereinafter. The seat member 1 as shown in FIG. 7(a) is formed into a shape having a constricted portion 1c, which is narrower in width than the backside 1a and the foreside 1b, in the forward/backward middle of the seat member 1. The foreside 1b is curved upward (See FIG. 2) and is formed in a fork shape with a lateral middle portion cut away. The user sits on the seat member 1 with his left and right legs positioned laterally on both sides of the constricted portion 1c. According thereto, the wide backside 1a and foreside 1b prevent the seat member 1 from being misaligned relative to the user in the forward/backward direction and the upward curved foreside 1b avoids the leg swinging forward from hitting against the foreside 1b while walking, thereby securing the degree of freedom in leg motion while walking. Furthermore, the foreside 1b formed in the fork shape facilitates the foreside 1b to flex laterally. Therefore, even if the forward swinging leg abuts the foreside 1b, the flexion of the foreside 1b absorbs the abutment force and the seat member 1 can be thereby prevented from yawing due to the abutment of the leg. In addition, the user's crotch or the like does not abut the foreside 1b and therefore the seat member 1 becomes comfortable to sit in. The backside 1a has an enough width to receive the user's left and right ischial bones. Accordingly, the weight relief assist force can be reliably transmitted to the user by means of the contact with the ischial bones.

Figure 7B:
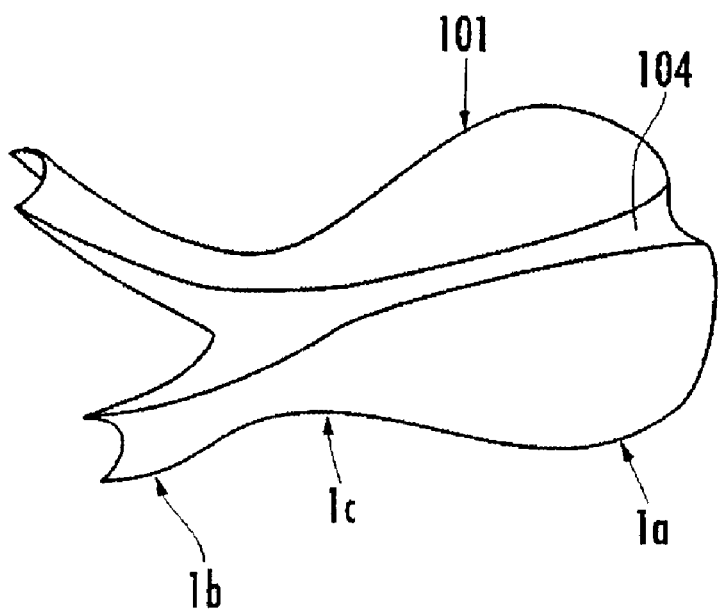

The seat member 1 includes a core 101 formed of a carbon fiber or the like, a cushioning material 102 put on the upper surface of the core 101, and a cover 103 which covers the core 101 and the cushion material 102. The core 101 has a concavity 104 in the lateral middle of the core 101 extending in the forward/backward direction as shown in FIG. 7(b), with the cushion material 102 put on both sides of the concavity 104. In addition, the wall thickness of the outer edge of the core 101 is made thin, so that the abutment forces of the legs from the sides can be flexibly absorbed.

Although the preferred embodiment of the present invention has been described hereinabove with reference to attached drawings, the present invention is not limited to the above embodiment. For example, it is also possible to dispose the driving source 9 coaxially with the second joint 5 with a heavy load such as a battery mounted as a weight member on the overhanging portion 42. Moreover, each leg link can be bent with the second joint projecting backward of the reference line when the user is standing upright. In this case, each leg link is provided with an overhanging portion which projects forward of the reference line, with a driving source, a battery, or the like mounted as a weight member. Furthermore, the first joint 3 includes the arc-shaped guide track 32 and the forward/backward swing fulcrum 3a of each of the leg links 2L and 2R in the first joint 3 is located above the seat member 1 in this embodiment. The first joint 3, however, can also be a joint portion having a simple structure with a lateral shaft which pivotally supports the upper end of each of the leg links 2L and 2R so as to be free to swing in the forward/backward direction. Furthermore, the load transfer portion can be a waist support belt as has been conventional. Still further, to assist a user who is handicapped in one leg due to a fracture of the leg in walking, it is also possible to leave only the leg link on the side of the user's handicapped leg of the left and right leg links 2L and 2R in the above embodiment, while omitting the other leg link.

The invention claimed is:

1. A walking assisting device comprising a load transfer portion and a leg link connected to the load transfer portion via a first joint in such a way as to be swingable in a forward and backward direction, in which at least a part of a user's weight is supported by the leg link via the load transfer portion, the leg link including a freely bending and stretching link having a second joint midway in a vertical direction, with a foot attachment portion configured to be attached to a user's foot being connected to a lower end of the leg link via a third joint, and the leg link being formed in such a length that it is bent with the second joint projecting forward or backward of a reference line when the user is standing upright, where the reference line is defined as a line connecting a forward/backward swing fulcrum of the leg link in the first joint to the third joint;

wherein the leg link is provided with an overhanging portion which projects on a side opposite to the second joint in the forward and backward direction relative to the reference line, with a weight member mounted on the overhanging portion, the weight member includes a driving source for the second joint and a driving force generated by the driving source is transmitted to the second joint via a driving force transmission means, and the driving force transmission means includes a wire transmission mechanism with a wire between the second joint and the driving source.

2. The walking assisting device according to claim 1, wherein, when the user is standing upright, the second joint is disposed in the forward direction relative to the reference line and the overhanging portion is disposed in the backward direction relative to the reference line.

3. The walking assisting device according to claim 1, wherein the overhanging portion is provided at an end of the leg link on the side of the first joint.

4. The walking assisting device according to claim 1, wherein the overhanging portion is spaced from the load transfer portion.

5. The walking assisting device according to claim 1, wherein the weighted member is directly mounted on the overhanging portion and is spaced from the leg link and the load transfer portion.

6. The walking assisting device according to claim 1, wherein the user is standing upright when both legs of the user are substantially aligned with a trunk of the user and both feet of the user are on a ground surface substantially below the trunk of the user.

7. The walking assisting device according to claim 1, wherein the overhanging portion is directly attached to the leg link at an end of the leg link opposite to the lower end.

8. The walking assisting device according to claim 1, wherein the weight member is disposed in a vertical direction between the forward/backward swing fulcrum of the leg link and the second joint.

9. The walking assisting device according to claim 1, wherein the overhanging portion is a plate member having a first portion at which the overhanging portion is directly attached to the leg link and a second portion which projects in a forward or backward direction from the first portion.

10. The walking assisting device according to claim 9, wherein the weight member is provided on the second portion of the overhanging portion.

11. The walking assisting device according to claim 1, wherein the first joint includes an arc-shaped guide track longitudinally provided in the forward and backward directions, the leg link includes a slider provided at an upper end thereof, the slider being configured to movably engage the guide track so as to be moveable in the forward and backward directions along the guide track, and the overhanging portion is directly attached to and projects from the slider.

12. The walking assisting device according to claim 11, wherein the overhanging portion is a plate member having a first portion at which the overhanging portion is directly attached to the slider and a second portion which projects in a forward or backward direction from the first portion.

13. The walking assisting device according to claim 12, wherein the weight member is provided on the second portion of the overhanging portion.

14. The walking assisting device according to claim 13, wherein the weight member is a battery, and said battery is electrically connected to said driving source provided co-axially with the second joint.

15. The walking assisting device according to claim 11, wherein the first joint further includes a support plate which supports the guide track, said support plate being directly attached to the load transfer portion such that the guide track is spaced from the load transfer portion by the support plate.

16. The walking assisting device according to claim 15, wherein the load transfer portion is attached to an upper end of the support plate and the guide track is provided along a lower end of the support plate.

* * * * *